US007499126B2

(12) United States Patent
Ham

(10) Patent No.: US 7,499,126 B2
(45) Date of Patent: Mar. 3, 2009

(54) POLARIZING FILM AND DISPLAY DEVICE HAVING THE SAME

(75) Inventor: Yeon-Sik Ham, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 275 days.

(21) Appl. No.: 11/496,220

(22) Filed: Jul. 31, 2006

(65) Prior Publication Data
US 2007/0030418 A1 Feb. 8, 2007

(30) Foreign Application Priority Data
Aug. 8, 2005 (KR) .................. 10-2005-0072096
Jul. 27, 2006 (KR) .................. 10-2006-0070518

(51) Int. Cl.
G02F 1/1335 (2006.01)
G02B 27/28 (2006.01)

(52) U.S. Cl. ............... 349/96; 349/106; 349/104; 359/483; 359/502

(58) Field of Classification Search ............... 349/96, 349/84, 89, 122, 104, 106, 141; 359/483, 359/501, 502
See application file for complete search history.

(56) References Cited

U.S. PATENT DOCUMENTS

2005/0128411 A1* 6/2005 Nagai et al. ............... 349/141
2006/0001799 A1* 1/2006 Kawamoto et al. ........... 349/96
2006/0238680 A1* 10/2006 Park et al. .................. 349/117

* cited by examiner

Primary Examiner—Brian M Healy
(74) Attorney, Agent, or Firm—Cantor Colburn LLP

(57) ABSTRACT

A polarizing film includes a first and second protecting layer and a polarizing layer therebetween. The polarizing layer is formed on the first protecting layer. The second protecting layer is formed on the polarizing layer. The second protecting layer has a retardation value of about 110 nm to about 200 nm along a direction corresponding to a thickness of the second protecting layer (a thickness-wise direction), wherein the retardation value Rth along the thickness-wise direction is expressed by the following equation: $Rth=d(n_x-n_z)$, wherein 'd' represents the thickness of the second protecting layer, $n_x$ represents a refractive index along an x-direction, and $n_z$ represents a refractive index along a z-direction. Therefore, a cost of manufacturing a display device is reduced because an expensive compensating film may be attached to only one surface of the LCD panel. Furthermore, a color shift problem is solved to enhance a display quality.

16 Claims, 7 Drawing Sheets

POLARIZING FILM AND DISPLAY DEVICE HAVING THE SAME

This application claims priority to Korean Patent Application No. 2005-72096, filed on Aug. 8, 2005 and Korean Patent Application No. 2006-70518, filed on Jul. 27, 2006, and all the benefits accruing therefrom under 35 U.S.C. §119, and the contents of which in their entireties are herein incorporated by reference.

BACKGROUND OF THE INVENTION

1. Field of the Invention

The present invention relates to a polarizing film and a display device having the polarizing film. More particularly, the present invention relates to a polarizing film having an improved color shift and a display device having the polarizing film.

2. Description of the Related Art

A liquid crystal display ("LCD") device typically includes a color filter substrate, an array substrate and a liquid crystal layer disposed between the color filter substrate and the array substrate. When an electric field is applied to the liquid crystal layer, an arrangement of liquid crystal molecules of the liquid crystal layer is changed. When the arrangement of liquid crystal molecules of the liquid crystal layer is changed, optical transmittance of the liquid crystal layer is changed to display an image.

The LCD device has many merits and advantages, and is therefore used in various fields. Such merits and advantages include a low driving voltage, low power consumption, simple driving circuit, simple peripheral circuit, light weight, and small volume, to name a few.

However, the LCD device has the disadvantage of having a narrow viewing angle. In order to overcome the disadvantage of the narrow viewing angle, multiple domain technology, in plane switching ("IPS") mode technology, vertical alignment mode technology, light path adjusting technology, and phase compensating technology, for example, have been developed.

According to phase compensating technology, a polarizing film having a phase compensating layer is employed. In detail, the polarizing film of a biaxial type, a uniaxial type, a liquid crystal ("LC") coating type, etc., has a phase compensating layer attached thereto. However, a cost of the above-mentioned polarizing film is very high.

In order to reduce a cost of manufacturing the LCD device, the phase compensating layer is attached to only one of two polarizing films, for example, a polarizing film disposed on an outer face of the array substrate or a polarizing film disposed on an outer face of the color filter substrate. However, many problems are induced when the phase compensating layer is attached to only one of the polarizing films.

One of the many problems that are induced includes a color shift when a black color is displayed. Furthermore, according to a patterned vertical alignment ("PVA") mode, although contrast ratio is high, uniformity is lowered due to the color shift.

BRIEF SUMMARY OF THE INVENTION

Exemplary embodiments of the present invention provide a polarizing film capable of enhancing a display quality.

Exemplary embodiments of the present invention also provide a display device having the above-mentioned polarizing film.

In an exemplary embodiment of a polarizing film according to the present invention, the polarizing film includes a first protecting layer, a polarizing layer and a second protecting layer. The polarizing layer is formed on the first protecting layer. The second protecting layer is formed on the polarizing layer. The second protecting layer has a retardation value Rth of about 110 nm to about 200 nm along a direction corresponding to the thickness of the second protecting layer (a thickness-wise direction), wherein the retardation value Rth along the thickness-wise direction is expressed by the following equation:

$$Rth = d(n_x - n_z),$$

wherein 'd' represents the thickness of the second protecting layer, $n_x$ represents a refractive index along an x-direction, and $n_z$ represents a refractive index along a z-direction.

For example, at least one of the polarizing layer comprises polyvinyl alcohol (PVA), and the first and second protecting layers comprise triacetyl cellulose (TAC).

In another exemplary embodiment of a polarizing film according to the present invention, the polarizing film includes a first protecting layer, a polarizing layer, a second protecting layer and a third protecting layer. The polarizing layer is formed on the first protecting layer. The second protecting layer is formed on the polarizing layer. The second protecting layer has a first retardation value of about 45 nm to about 55 nm along a direction corresponding to the thickness of the second protecting layer (a thickness-wise direction). The third protecting layer is formed on the second protecting layer. The third protecting layer has a second retardation value Rth of about 45 nm to about 80 nm along the thickness-wise direction. The retardation value Rth along the thickness-wise direction is expressed by the following equation:

$$Rth = d(n_x - n_z),$$

wherein 'd' represents a thickness of the second or third protecting layer, $n_x$ represents a refractive index along an x-direction, and $n_z$ represents a refractive index along a z-direction.

For example, at least one of the polarizing layer comprises polyvinyl alcohol (PVA), and the first, second and third protecting layers comprise triacetyl cellulose (TAC).

In an exemplary embodiment of a display device according to the present invention, the display device includes a liquid crystal display panel, a first polarizing film and a second polarizing film. The liquid crystal display panel has a display substrate, an opposite substrate facing the display substrate, and a liquid crystal layer disposed between the display substrate and the opposite substrate. The first polarizing film has a compensating layer disposed on the opposite substrate, a first protecting layer disposed on the compensating layer, a first polarizing layer disposed on the first protecting layer, and a second protecting layer disposed on the first polarizing layer. The second polarizing film has a third protecting layer disposed under the display substrate, a second polarizing layer disposed under the third protecting layer, and a fourth protecting layer disposed under the second polarizing layer. The second polarizing film satisfying the following equation, $$Rth = 6T + b,$$

wherein Rth represents a retardation value of the third protecting layer of the second polarizing film along a thickness-wise direction of the third protecting layer in a nanometer scale, 'T' represent a thickness of the liquid crystal layer of the liquid crystal display panel, the 'b' is in a range of about 100 to about 114.

For example, the first and second polarizing layer includes polyvinyl alcohol (PVA), and the first, second, third and fourth protecting layers comprise triacetyl cellulose (TAC).

In another exemplary embodiment of a display device according to the present invention, the display device includes a liquid crystal display panel, a first polarizing film and a second polarizing film. The liquid crystal display panel has a display substrate, an opposite substrate facing the display substrate, and a liquid crystal layer disposed between the display substrate and the opposite substrate. The first polarizing film has a compensating layer disposed on the opposite substrate, a first protecting layer disposed on the compensating layer, a first polarizing layer disposed on the first protecting layer, and a second protecting layer disposed on the first polarizing layer. The second polarizing film has a third protecting layer disposed under the display substrate, a fourth protecting layer disposed under the third protecting layer, a second polarizing layer disposed under the fourth protecting layer of which retardation value along a thickness-wise direction is in a range of about 45 nm to about 55 nm, and a fifth protecting layer disposed under the second polarizing layer. The second polarizing film satisfying the following equation, $Rth = 6T + b$, wherein Rth represents a retardation value of the third protecting layer of the second polarizing film along a thickness-wise direction of the third protecting layer in a nanometer scale, 'T' represent a thickness of the liquid crystal layer of the liquid crystal display panel, the 'b' is in a range of about 40 to about 53.

For example, the first and second polarizing layer comprises polyvinyl alcohol (PVA), and the first, second, third, fourth and fifth protecting layers comprise triacetyl cellulose (TAC).

In another exemplary embodiment of a display device according to the present invention, the display device includes a liquid crystal display panel, a first polarizing film and a second polarizing film. The liquid crystal display panel displays an image. The liquid crystal display panel has a first face and a second face. The first polarizing film includes a compensating layer formed on the first face of the liquid crystal display panel, a first protecting layer formed on the compensating layer to protect the compensating layer, a first polarizing layer formed on the first protecting layer, and a second protecting layer formed on the first polarizing layer. The second polarizing film includes a third protecting layer formed on the second face of the liquid crystal display panel, a second polarizing layer formed on the third protecting layer, a fourth protecting layer formed on the second polarizing layer.

Therefore, a cost of manufacturing a display device is reduced because an expensive compensating film may be attached to only one surface face of the LCD panel.

Furthermore, the color shift problem, which occurs when the compensating film is attached to only one surface face of the LCD panel, is solved to enhance a display quality.

BRIEF DESCRIPTION OF THE DRAWINGS

The above and other features and advantages of the present invention will become more apparent by describing in detailed exemplary embodiments thereof with reference to the accompanying drawings, in which.

DETAILED DESCRIPTION OF THE INVENTION

Figure 1:
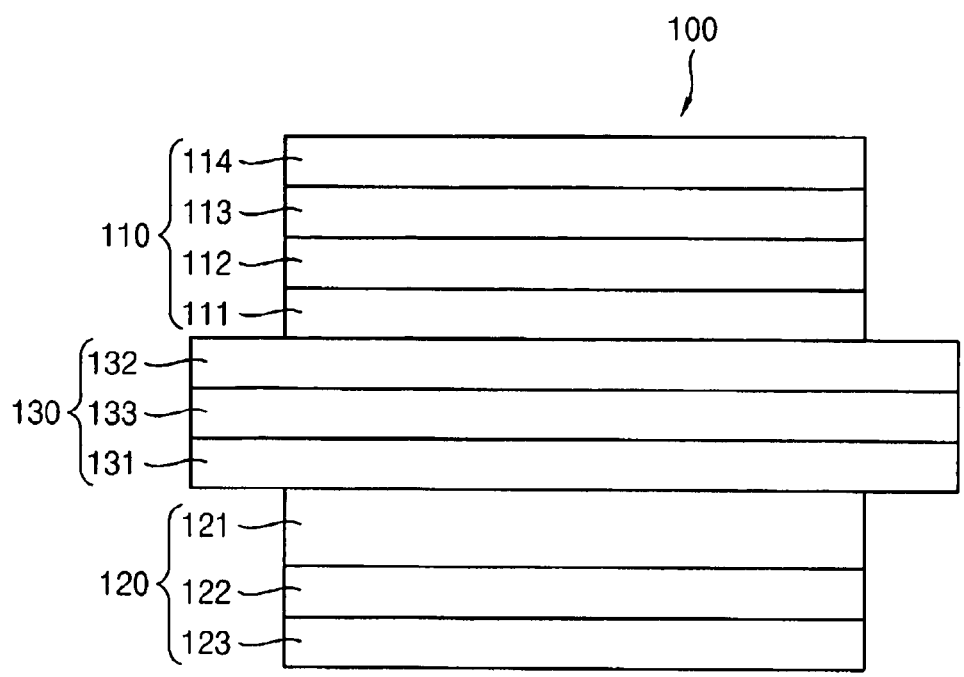
FIG. 1 is a schematic cross-sectional view illustrating an exemplary embodiment of a display device according to the present invention.

The invention is described more fully hereinafter with reference to the accompanying drawings, in which exemplary embodiments of the present invention are shown. This invention may, however, be embodied in many different forms and should not be construed as limited to the exemplary embodiments set forth herein. Rather, these exemplary embodiments are provided so that this disclosure will be thorough and complete, and will fully convey the scope of the present invention to those skilled in the art. In the drawings, the size and relative sizes of layers and regions may be exaggerated for clarity.

It will be understood that when an element or layer is referred to as being "on", "connected to" or "coupled to" another element or layer, it can be directly on, connected to or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular exemplary embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the present invention are described herein with reference to cross-section illustrations that are schematic illustrations of idealized exemplary embodiments (and intermediate structures) of the present invention. As such, variations from the shapes of the illustrations as a result, for example, of manufacturing techniques and/or tolerances, are to be expected. Thus, exemplary embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a schematic cross-sectional view illustrating an exemplary embodiment of a display device according to the present invention.

Referring to FIG. 1, a display device 100 according to an exemplary embodiment of the present invention includes a first polarizing film 110, a second polarizing film 120 and a liquid crystal display (LCD) panel 130. The first and second polarizing films 110 and 120 are disposed on upper and lower faces, respectively, of the LCD panel 130.

The first polarizing film 110 includes a compensating layer 111, a first protecting layer 112, a first polarizing layer 113 and a second protecting layer 114. The compensating layer 111 is disposed on an upper face of the LCD panel 130. The first protecting layer 112 is disposed on the compensating layer 111. The first polarizing layer 113 is disposed on the first protecting layer 112. The second protecting layer 114 is disposed on the first polarizing layer 113.

The compensating layer 111 includes a discotic liquid crystal that compensates a nematic liquid crystal of a liquid crystal layer in the LCD panel 130.

The first polarizing layer 113 includes, for example, polyvinyl alcohol (PVA). The PVA of the first polarizing layer 113 is stretched and dipped into an iodine (I) or dichromatic dye solution to arrange iodine molecules or dichromatic dye molecules along a stretching direction. The iodine molecules and the dichromatic dye molecules have a dichromatic character that absorb a first portion of light, which oscillates along the stretching direction, and transmit a second portion of light, which oscillates along a direction that is perpendicular to the stretching direction.

The first protecting layer 112 and the second protecting layer 114 include triacetyl cellulous (TAC). The first and second protecting layers 112 and 114 support and protect the first polarizing layer 113.

The LCD panel 130 includes an array substrate 131, a color filter substrate 132 facing the array substrate 131, and a liquid crystal layer 133 disposed between the array substrate 131 and the color filter substrate 132.

The array substrate 131 includes a plurality of gate lines (not shown) extending along a first direction, and a plurality of data lines (not shown) extending along a second direction that is different from the first direction. The array substrate 131 further includes a switching element (not shown) and a pixel electrode (not shown). The switching element and the pixel electrode are formed in a pixel region defined by two adjacent gate lines and two adjacent data lines. The pixel electrode includes an optically transparent and electrically conductive material such as indium tin oxide (ITO), indium zinc oxide (IZO), etc.

A thin film transistor ("TFT") may be employed as the switching element. The TFT includes a gate electrode that is electrically connected to one of the gate lines, a source electrode that is electrically connected to one of the data lines, and a drain electrode that is electrically connected to the pixel electrode.

The color filter substrate 132 includes a color filter layer (not shown) and a common electrode layer (not shown) formed on the color filter layer. The common electrode layer includes an optically transparent and electrically conductive material such as ITO, IZO, etc.

When a gate voltage is applied to the gate electrode through the gate line, the TFT is turned on, so that a data voltage of the data line is applied to the pixel electrode through the TFT. When the data voltage is applied to the pixel electrode, an electric field is generated between the pixel electrode of the array substrate 131 and the common electrode of the color filter substrate 132 to alter an arrangement of liquid crystal molecules of the liquid crystal layer 133. When the arrangement of liquid crystal molecules is altered, optical transmittance of the liquid crystal layer 133 is changed to display an image.

The second polarizing film 120 includes a third protecting layer 121, a second polarizing layer 122 and a fourth protecting layer 123. The third protecting layer 121 is disposed on an outer face of the array substrate 131 of the LCD panel 130. The second polarizing layer 122 is disposed under the third protecting layer 121. The fourth protecting layer 123 is disposed under the second polarizing layer 122.

The second polarizing layer 122 includes, for example, polyvinyl alcohol (PVA). The PVA of the second polarizing layer 122 is stretched and dipped into an iodine (I) or dichromatic dye solution to arrange iodine molecules or dichromatic dye molecules along a stretching direction. The iodine molecules and the dichromatic dye molecules have a dichromatic character that absorb a first portion of light, which oscillates along the stretching direction, and transmit a second portion of light, which oscillates along a direction that is perpendicular to the stretching direction.

The third protecting layer 121 and the fourth protecting layer 123 include, for example, triacetyl cellulous (TAC). The third and fourth protecting layers 121 and 123 support and protect the second polarizing layer 122 disposed therebetween.

A conventional third protecting layer has a retardation value (Rth) of about 45 nm to about 55 nm along a direction corresponding to a thickness of the third protecting layer. However, according to the present exemplary embodiment, the third protecting layer 121 of the present exemplary embodiment has a retardation value (Rth) of about 110 nm to about 200 nm along a direction corresponding to a thickness of the third protecting layer 121. When the third protecting layer 121 has the retardation value (Rth) of about 110 nm to about 200 nm along a thickness-wise direction, the color shift problem, which is one of the biggest problems of the conventional display device having the compensating layer 111 attached only one of the faces of the LCD panel 130, is reduced.

Figure 2:
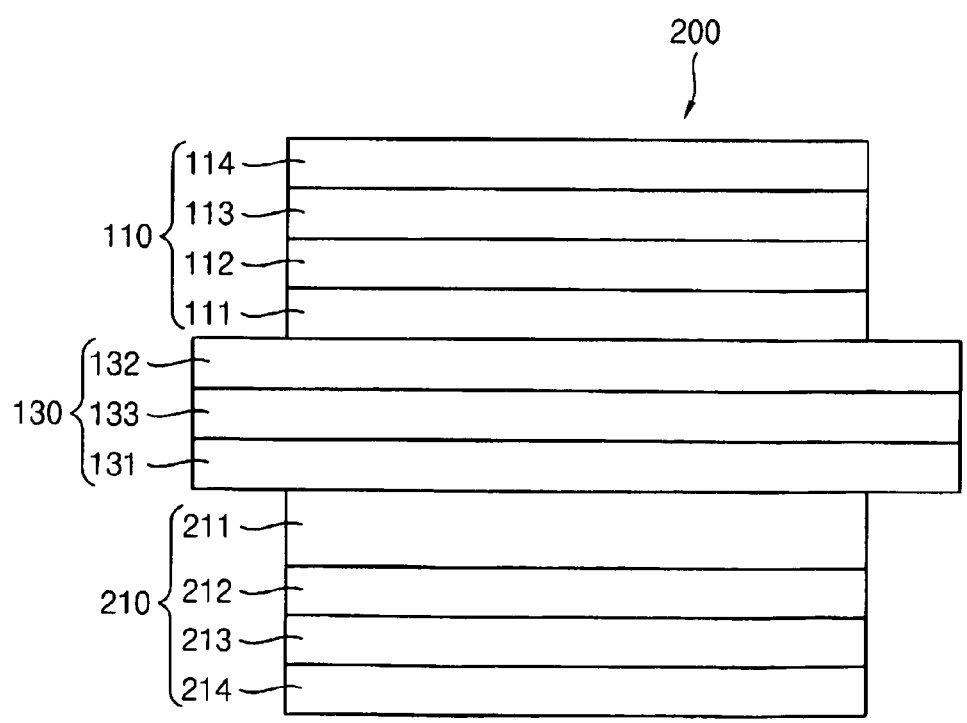
FIG. 2 is a schematic cross-sectional view illustrating another exemplary embodiment of a display device according to the present invention.

FIG. 2 is a schematic cross-sectional view illustrating an another exemplary embodiment of a display device according to the present invention.

Referring to FIG. 2, a display device 200, according to an exemplary embodiment of the present invention, includes a first polarizing film 110, a second polarizing film 210 and an LCD panel 130. The first polarizing film 110 and the second polarizing film 210 are attached to upper and lower faces, respectively, of the LCD panel 130. The display device in FIG. 2 is the same as in the display device in FIG. 1 except for the second polarizing film 210. Thus, the same reference numerals will be used to refer to the same or like parts as those described in FIG. 1, and any further explanation concerning the above elements will be omitted.

The second polarizing film 210 includes a third protecting layer 211, a fourth protecting layer 212, a second polarizing layer 213 and a fifth protecting layer 214. The third protecting layer 211 is disposed under the LCD panel 130. The fourth protecting layer 212 is disposed under the third protecting layer 211. The second polarizing layer 213 is disposed under the fourth protecting layer 212. The fifth protecting layer 214 is disposed under the second polarizing layer 214.

The second polarizing layer 213 includes, for example, polyvinyl alcohol (PVA). The PVA of the second polarizing layer 213 is stretched and dipped into an iodine (I) or dichromatic dye solution to arrange iodine molecules or dichromatic dye molecules along a stretching direction. The iodine molecules and the dichromatic dye molecules have a dichromatic character that absorb a first portion of light, which oscillates along the stretching direction, and transmit a second portion of light, which oscillates along a direction that is perpendicular to the stretching direction.

The third protecting layer 211, the fourth protecting layer 212 and the fifth protecting layer 214 include triacetyl cellulous (TAC). The third, fourth and fifth protecting layers 211, 212 and 214 support and protect the second polarizing layer 213 disposed therebetween.

The fourth protecting layer 212 of the present exemplary embodiment has a retardation value (Rth) of about 45 nm to about 55 nm along a direction corresponding to a thickness of the conventional polarizing film. However, according to the present exemplary embodiment, the second polarizing film 210 of the present exemplary embodiment further includes the third protecting layer 211 in order to adjust the retardation value along a thickness-wise direction. The third protecting layer 211 for adjusting the retardation value (Rth) along a thickness-wise direction has a retardation value (Rth) of about 45 nm to about 80 nm. The third protection layer 211 reduces the color shift problem, which is one of the biggest problems of the conventional display device having the compensating layer 111 attached to only one of the faces of the LCD panel 130.

Figure 3A:
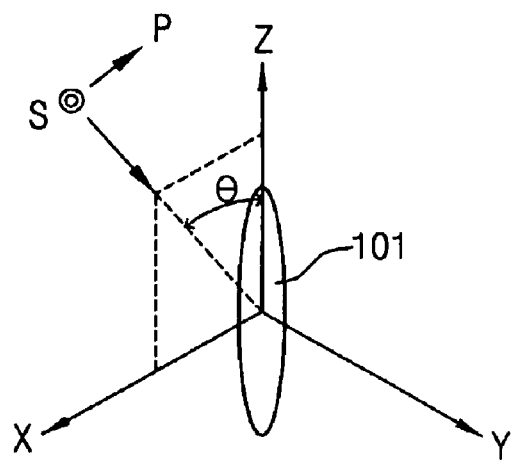
FIG. 3A is a diagram illustrating refractive indexes of nematic liquid crystal with respect to X, Y and Z axes.
Figure 3B:
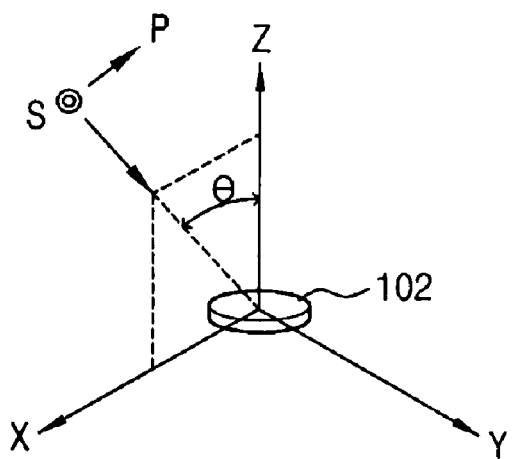
FIG. 3B is a diagram illustrating refractive indexes of discotic liquid crystal with respect to X, Y and Z axes.

FIG. 3A is a diagram illustrating refractive indexes of nematic liquid crystal with respect to X, Y and Z axes. FIG. 3B is a diagram illustrating refractive indexes of discotic liquid crystal with respect to X, Y and Z axes.

Referring to FIG. 3A, as light having an incident angle (θ) with respect to the director of nematic liquid crystal 101 increases, a refractive index for a primary wave (P) increases in a liquid crystal layer ($\Delta n_p/\Delta \theta > 0$). The refractive index in an X direction '$n_x$' and the refractive index in a Y direction '$n_y$' are substantially identical, each of which is smaller than the refractive index in a Z direction '$n_z$' ($n_z > n_x$, $n_y$).

Referring to FIG. 3B, as light having an incident angle (θ) with respect to a director of discotic liquid crystal 102 increases, a refractive index for a primary wave (P) decreases in a viewing angle compensating plate ($\Delta n_p/\Delta \theta < 0$). The refractive index in an X direction '$n_x$' and the refractive index in a Y direction '$n_y$' are substantially identical, each of which is greater than the refractive index in a Z direction '$n_z$' ($n_z < n_x$, $n_y$). In both FIGS. 3A and 3B, "S" represents a secondary wave (S).

Figure 3C:
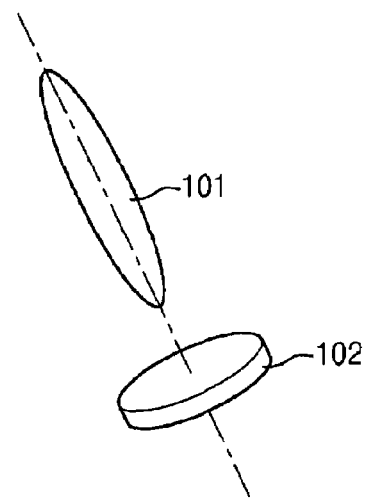
FIG. 3C is a diagram illustrating an exemplary embodiment of a process of compensating phase differences between light waves by a combination of the nematic liquid crystal of FIG. 3A and the discotic liquid crystal of FIG. 3B according to the present invention.

FIG. 3C, according to an exemplary embodiment of the present invention, is a diagram illustrating a process of compensating phase differences between light waves by a combination of the nematic liquid crystal of FIG. 3A and the discotic liquid crystal of FIG. 3B.

Referring to FIG. 3C, when the director of the nematic liquid crystal 101 is parallel with the radial axis of the discotic liquid crystal 102, the phase differences in the direction of light are more or less compensated. This is because the refractive index in the Z direction '$n_z$' has the greatest value in the liquid crystal layer 133 and the smallest value in the compensating layer as shown in FIGS. 3A and 3B.

Figure 3D:
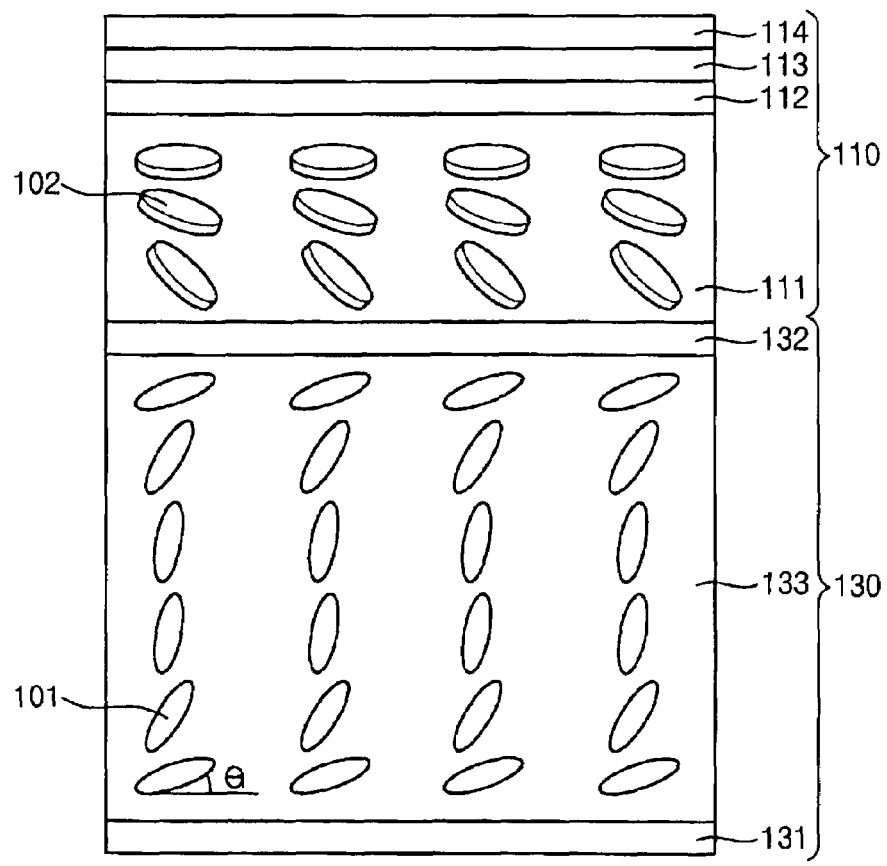
FIG. 3D is a schematic cross-sectional view illustrating a portion of a liquid crystal panel and a compensating film in FIGS. 1 and 2.

FIG. 3D is a schematic cross-sectional view illustrating a portion of a liquid crystal panel 130 and a compensating layer 111 in FIGS. 1 and 2.

Referring to FIG. 3D, the liquid crystal layer 133 disposed between the array substrate 131 and the color filter substrate 132 of the LCD panel 130 includes nematic liquid crystal molecules 101. The nematic liquid crystal molecules 101 are pre-tilted at an angle of $\theta_1$ (relative to surfaces defining the array substrate 131 and the color filter substrate 132) near the upper and lower portions of the liquid crystal layer 133. The directions of tilting at both portions are opposite to one another, e.g., the liquid crystal molecules 101 at the top portion tilt downwards and the liquid crystal molecules 101 at the bottom portion tilt upwards. In the middle of the liquid crystal layer 133, the nematic liquid crystal molecules 101 are substantially vertically aligned with respect to the first polarizing film 110.

The nematic liquid crystal molecules 101 in the liquid crystal layer 133 are arranged to minimize Helmholtz free energy. The molecular arrangement of the nematic liquid crystal molecules 101 in the liquid crystal layer 133 may be obtained by the following method.

The Helmholtz free energy density of the nematic liquid crystal molecules 101 in the liquid crystal layer 133 is a summation of elastic energy density of the nematic liquid crystal molecules 101 and energy density caused by an electromagnetic field applied to the nematic liquid crystal molecules 101. Elastic energy density is generated when liquid crystal is splayed, twisted or bent. The total elastic energy density plus the electromagnetic field energy density ($\frac{1}{2}(\epsilon_0 E^2)$), where $\epsilon_0$ is the electric permittivity, and E is the electric field strength, gives the Helmholtz free energy density. In an electrostatic field, a magnetic field can be ignored.

The integration of the Helmholtz free energy density over a space that the total liquid crystal layer 133 occupies gives a Helmholtz free energy. An Euler-Lagrange equation is set using a variation method. The Euler-Lagrange equation gives the conditions under which the Helmholtz free energy has a minimum value.

According to the Euler-Lagrange equation, Helmholtz free energy has a minimum value when the pre-tilt angle of the nematic liquid crystal molecules 101 at the upper and lower portions of the liquid crystal layer 133 is identical, and when the nematic liquid crystal molecules 101 at the upper and lower portions of the liquid crystal layer 133 are symmetrically arranged about the central portion of the liquid crystal layer 133.

The value for the pre-tilt angle $\theta_1$ ($0<\theta_1<90$) of the nematic liquid crystal molecules 101 arranged near the boundary of the liquid crystal layer 133 and the first polarizing film 110 is substituted into the Euler-Lagrange equation. The substitution of the value for $\theta_1$ into the Euler-Lagrange equation results in an overall arrangement of the nematic liquid crystal molecules 101 in the liquid crystal layer 133 that has the same effect as the arrangement shown in FIG. 3D. That is, the director of discotic liquid crystal molecules 102 in the first polarizing film 110 is parallel with the radial axis of nematic liquid crystal molecules 101 in the liquid crystal layer 133, thereby reducing phase differences and improving viewing angle as described with reference to FIG. 3C. It should be appreciated that, although the nematic liquid crystal molecules 101 are not shown as being twisted in FIG. 3D, in practice, the nematic liquid crystal molecules 101 are twisted 90° by a condition at the boundary.

The first polarizing film 110 including the compensating layer 111 having discotic liquid crystal molecules 102 is disposed over the liquid crystal layer 133. The discotic liquid crystal molecules 102 of the compensating layer 111 are arranged such that directors of the first closest row of discotic liquid crystal molecules 102 of the compensating layer 111 are substantially parallel with directors of the first closet row of the nematic liquid crystal molecules 101 of the liquid crystal layer 133, the second closet row of discotic liquid crystal molecules 102 of the compensating layer 111 are parallel with directors of the second closet row of nematic liquid crystal molecules 101 of the liquid crystal layer 133, etc., in order to widen a viewing angle.

Figure 4:
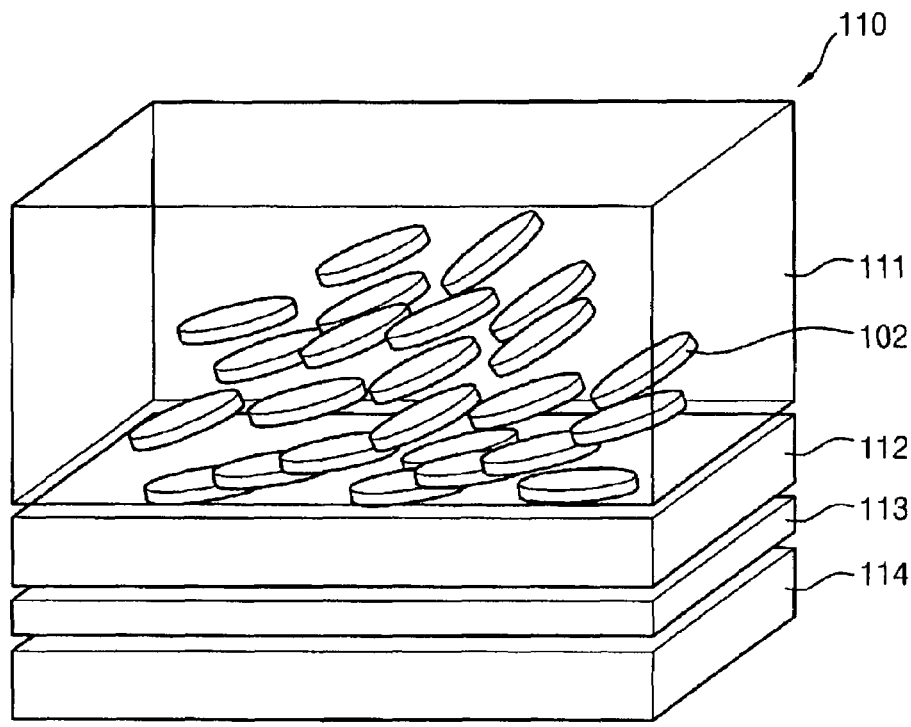
FIG. 4 is a partial sectional perspective view of an exemplary embodiment of a viewing angle compensating plate attached to a glass substrate according to the present invention.

FIG. 4 is a partial sectional perspective view of an exemplary embodiment of a viewing angle compensating plate attached to a glass substrate according to the invention.

In FIG. 4, a viewing angle compensating plate attached to the 90°-twisted nematic liquid crystal layer of FIG. 3A is illustrated. The viewing angle compensating layer 111 that is attached to the liquid crystal layer 133 of the vertical alignment mode liquid crystal display apparatus of FIG. 3B has the same structure as that of the 90°-twisted nematic mode liquid crystal display apparatus except for the direction of the liquid crystal. Therefore, the viewing angle compensating plate that is attached to the liquid crystal layer of the vertical alignment mode liquid crystal display apparatus is not described in further detail.

Referring to FIG. 4, the first polarizing film 110 includes the second protecting layer 114 having triacetyl cellulous (TAC), the first polarizing layer 113 having poly vinyl alcohol (PVA), the first protecting layer 112 having triacetyl cellulous (TAC), and the compensating layer 111 that has discotic liquid crystal 102 and is disposed on the first protecting layer 112.

The first protecting layer 112 and the second protecting layer 114 support and protect the first polarizing layer 113 disposed therebetween. Conventionally, only one protecting layer has been attached to only one face of the polarizing layer. However, when only one protecting layer is attached to one face of the polarizing layer, a remaining opposite face of the polarizing layer not having a protecting layer attached thereto is damaged.

The first polarizing layer 113 including PVA polarizes light. For example, a PVA film is stretched and adsorbs iodine or dichromatic dye to form the first polarizing layer 113. The stretching direction corresponds to an absorbing direction of a polarizing direction.

The compensating layer 111 may be formed as follows. Liquid solvent, including discotic liquid crystal molecules 102, is coated on the first protecting layer 111 and heated to vaporize the liquid solvent. Then, the discotic liquid crystal molecules 102 are rubbed to be tilted, so that the compensating layer 111 is completed.

In FIG. 4, a thickness of the compensating layer 111 is exaggerated in order to illustrate an arrangement of discotic liquid crystal molecules 102. For example, the compensating layer 111 of the first polarizing film 110 is in a range of about 2 µm to about 3 µm, and a thickness of the first polarizing layer 113 is in a range of about 25 µm.

Figure 5:
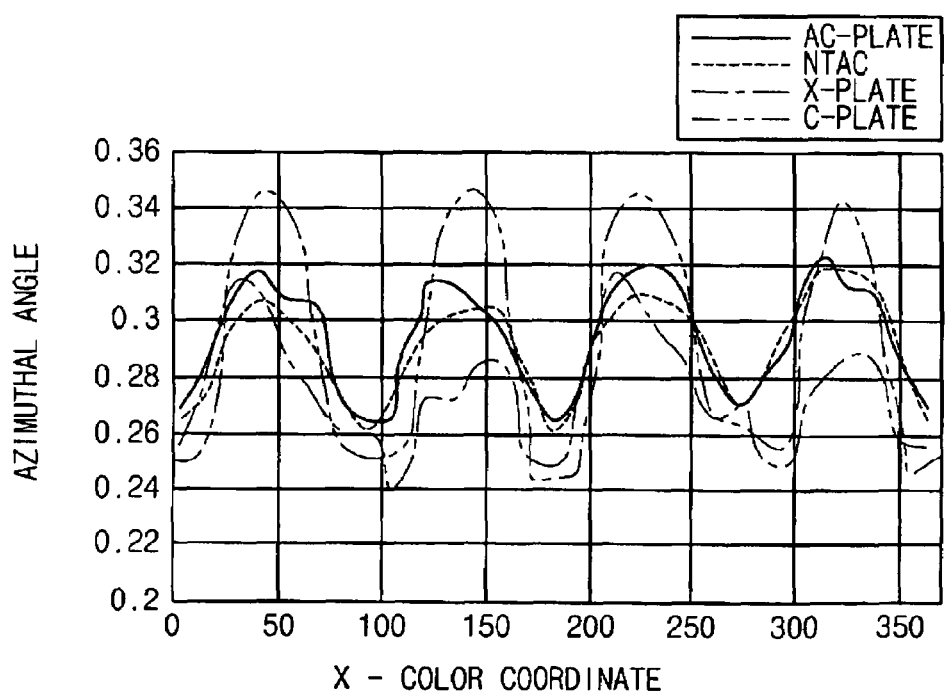
FIG. 5 is a graph showing a relationship between an X-color coordinate and an azimuthal angle.
Figure 6:
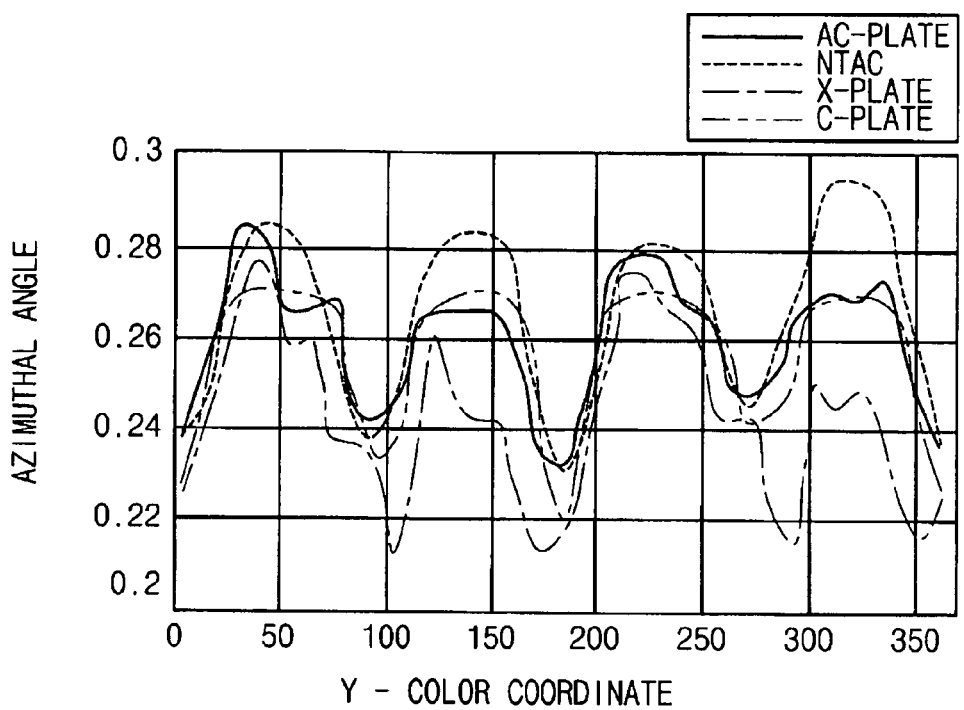
FIG. 6 is a graph showing a relationship between a Y-color coordinate and an azimuthal angle.

FIG. 5 is a graph showing a relationship between an X-color coordinate and an azimuthal angle. FIG. 6 is a graph showing a relationship between a Y-color coordinate and an azimuthal angle.

References in FIGS. 5 and 6 are graphs corresponding to an AC-PLATE and NTAC that have been used. A graph corresponding to an X-PLATE is obtained through an LCD panel including a first polarizing film having a conventional compensating layer, and a second polarizing film having a conventional third protecting layer having a retardation value of about 45 nm to about 55 nm along a thickness-wise direction. According to the graph of X-PLATE, a color shift is aggravated. According to a graph of C-PLATE, which is obtained through a display panel having a second polarizing film that has a viewing angle compensating plate (c-plate) formed on a third protecting layer, a color shift is improved.

However, c-plate is still expensive. By adjusting a thickness of the third protecting layer, a same retardation value may be obtained as that of the c-plate.

Figure 7:
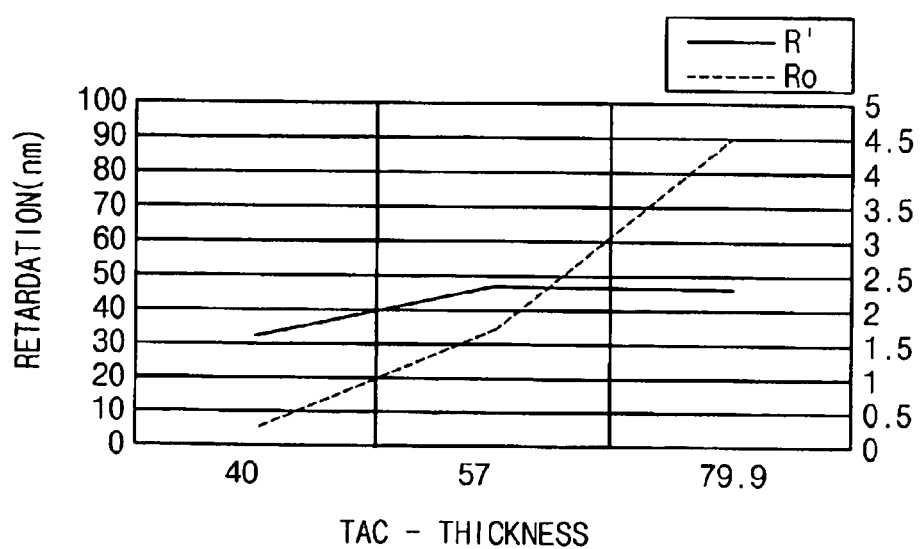
FIG. 7 is a graph showing a relationship between a thickness of a protection layer and a retardation value.

FIG. 7 is a graph showing a relationship between a thickness of a protection layer and a retardation value.

As shown in FIG. 7, when a thickness of a triacetyl cellulose (TAC) layer increases, both a retardation value (Ro) along a surface direction of the TAC layer and a retardation value (R') increase. As a result, the same effect may be obtained by adjusting a thickness of the third protecting layer to have an effect of using the c-plate.

A liquid crystal layer 133 in FIGS. 1 and 2 may have various thicknesses. Therefore, optimal retardation values corresponding to the thickness of the liquid crystal layer 133 of the LCD panel 130 was measured in the present invention.

The relation between the thickness of the liquid crystal layer 133 of the LCD panel 130 in FIG. 1 and the measured optimal retardation values Ro and Rth of the third protecting layer 121 of the second polarizing film 120 along the surface-wise direction and the thickness-wise direction, respectively is shown in following Table 1.

TABLE 1

| Liquid crystal layer | Ro (+/− 5 nm) | Rth (+/− 10)nm | Refractive index of liquid crystal |
|---|---|---|---|
| 3.6 | 3 nm | 107.7 | 0.082 |
| 3.7 | 3 nm | 115.9 | |
| 3.75 | 3 nm | 120 | |
| 3.8 | 5 nm | 124.1 | |
| 3.95 | 5 nm | 136.4 | |
| 4 | 5 nm | 140.5 | |
| 4.05 | 5 nm | 144.6 | |
| 4.1 | 8 nm | 148.7 | |

Figure 8:
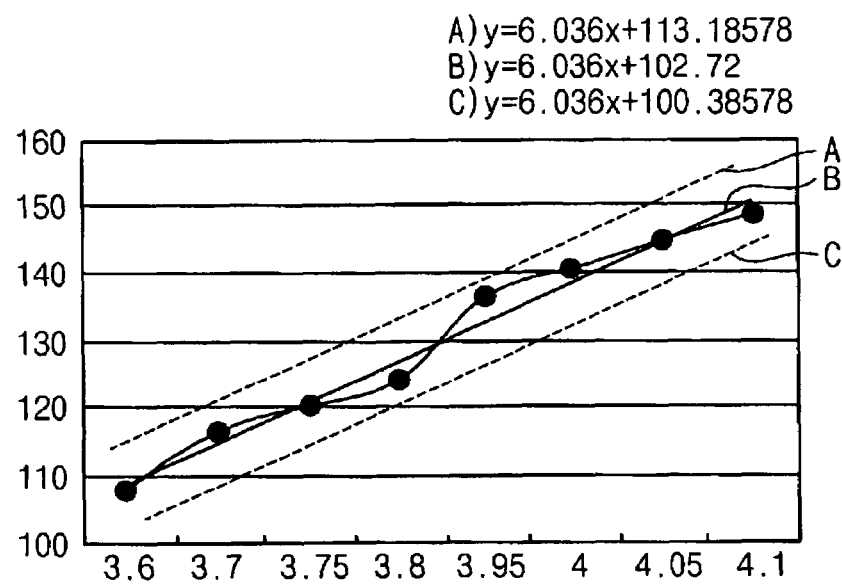
FIG. 8 is a graph showing a relationship between a thickness of the liquid crystal layer of the display panel and an optimal retardation value along a thickness-wise direction of the third protecting layer of a second polarization film in FIG. 1.

A graph plotted by the Table 1 is shown in FIG. 8.

FIG. 8 is a graph showing a relationship between a thickness of the liquid crystal layer of the display panel and an optimal retardation value along a thickness-wise direction of the third protecting layer of a second polarization film in FIG. 1.

In FIG. 8, the x-axis corresponds to a thickness of the liquid crystal layer 133 of the LCD panel 130 in FIG. 1, and the y-axis corresponds to the optimal retardation value Rth of the third protecting layer 121 along the thickness-wise direction.

Referring to FIGS. 1 and 8, the optimal retardation value Rth of the third protecting layer 121 of the second polarizing film 120 along the thickness-wise direction is roughly proportional to the thickness of the liquid crystal layer 133 of the LCD panel 130. The linear approximate expression between the thickness of the liquid crystal layer 133 of the LCD panel 130 and the optimal retardation value Rth of the third protecting layer 121 of the second polarizing film 120 along the thickness-wise direction may be expressed as the following Expression 1.

$$Rth = 6.0036T + 102.72, \quad \text{Expression 1}$$

wherein Rth represents the optimal retardation value Rth of the third protecting layer 121 of the second polarizing film 120 along the thickness-wise direction in a nanometer scale and 'T' represents the thickness of the liquid crystal layer 133 in micrometer scale.

The above Expression 1 may be expressed as the following Expression 2 by considering deviation.

$$Rth = 6T + b, \quad \text{Expression 2}$$

wherein Rth represents the optimal retardation value Rth of the third protecting layer 121 of the second polarizing film 120 along the thickness-wise direction in a nanometer scale, 'T' represents the thickness of the liquid crystal layer 133 in a micrometer scale, and 'b' is in a range of about 100 to about 114.

The relation between the thickness of the liquid crystal layer 133 of the LCD panel 130 in FIG. 3 and the measured optimal retardation values Ro and Rth of the third protecting layer 211 of the second polarizing film 120 along the surface-wise direction and the thickness-wise direction, respectively is shown in following Table 2.

TABLE 2

| Liquid crystal layer | Ro (+/− 5 nm) | Rth (+/−10)nm | Refractive index of liquid crystal |
|---|---|---|---|
| 3.6 | 3 nm | 47.7 | 0.082 |
| 3.7 | 3 nm | 55.9 | |
| 3.75 | 3 nm | 60 | |
| 3.8 | 5 nm | 64.1 | |
| 3.95 | 5 nm | 76.4 | |
| 4 | 5 nm | 80.5 | |
| 4.05 | 5 nm | 84.6 | |
| 4.1 | 8 nm | 88.7 | |

Figure 9:
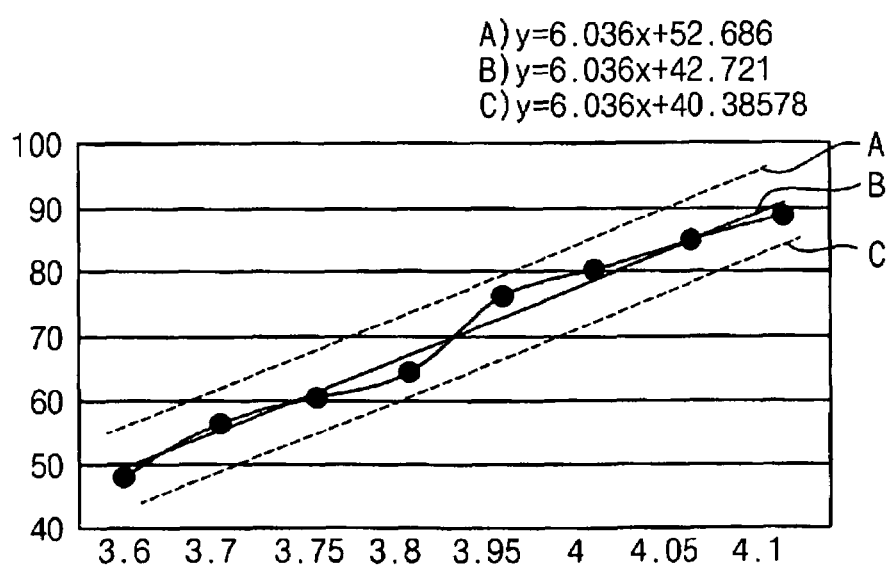
FIG. 9 is a graph showing a relationship between a thickness of the liquid crystal layer of the display device and an optimal retardation value along a thickness-wise direction of the third protecting layer of a second polarization film in FIG. 2.

A graph plotted by the Table 2 is shown in FIG. 9.

FIG. 9 is a graph showing a relationship between a thickness of the liquid crystal layer of the display panel and an optimal retardation value along a thickness-wise direction of the third protecting layer of a second polarization film in FIG. 2.

In FIG. 9, the x-axis corresponds to a thickness of the liquid crystal layer 133 of the LCD panel 130 in FIG. 2, and the y-axis corresponds to the optimal retardation value Rth of the third protecting layer 211 along the thickness-wise direction.

Referring to FIGS. 2 and 9, the optimal retardation value Rth of the third protecting layer 211 of the second polarizing film 210 along the thickness-wise direction is roughly proportional to the thickness of the liquid crystal layer 133 of the LCD panel 130. The linear approximate expression between the thickness of the liquid crystal layer 133 of the LCD panel 130 and the optimal retardation value Rth of the third protecting layer 211 of the second polarizing film 210 along the thickness-wise direction may be expressed as the following Expression 3.

$$Rth = 6.0036T + 42.721, \quad \text{Expression 3}$$

wherein Rth represents the optimal retardation value Rth of the third protecting layer 211 of the second polarizing film 210 along the thickness-wise direction in a nanometer scale and 'T' represents the thickness of the liquid crystal layer 133 in a micrometer scale.

The above Expression 3 may be expressed as the following Expression 4 by considering deviation.

$$Rth = 6T + b, \quad \text{Expression 4}$$

wherein Rth represents the optimal retardation value Rth of the third protecting layer 211 of the second polarizing film 210 along the thickness-wise direction in a nanometer scale, 'T' represents the thickness of the liquid crystal layer 133 in a micrometer scale, and 'b' is in a range of about 40 to about 53.

Figure 10:
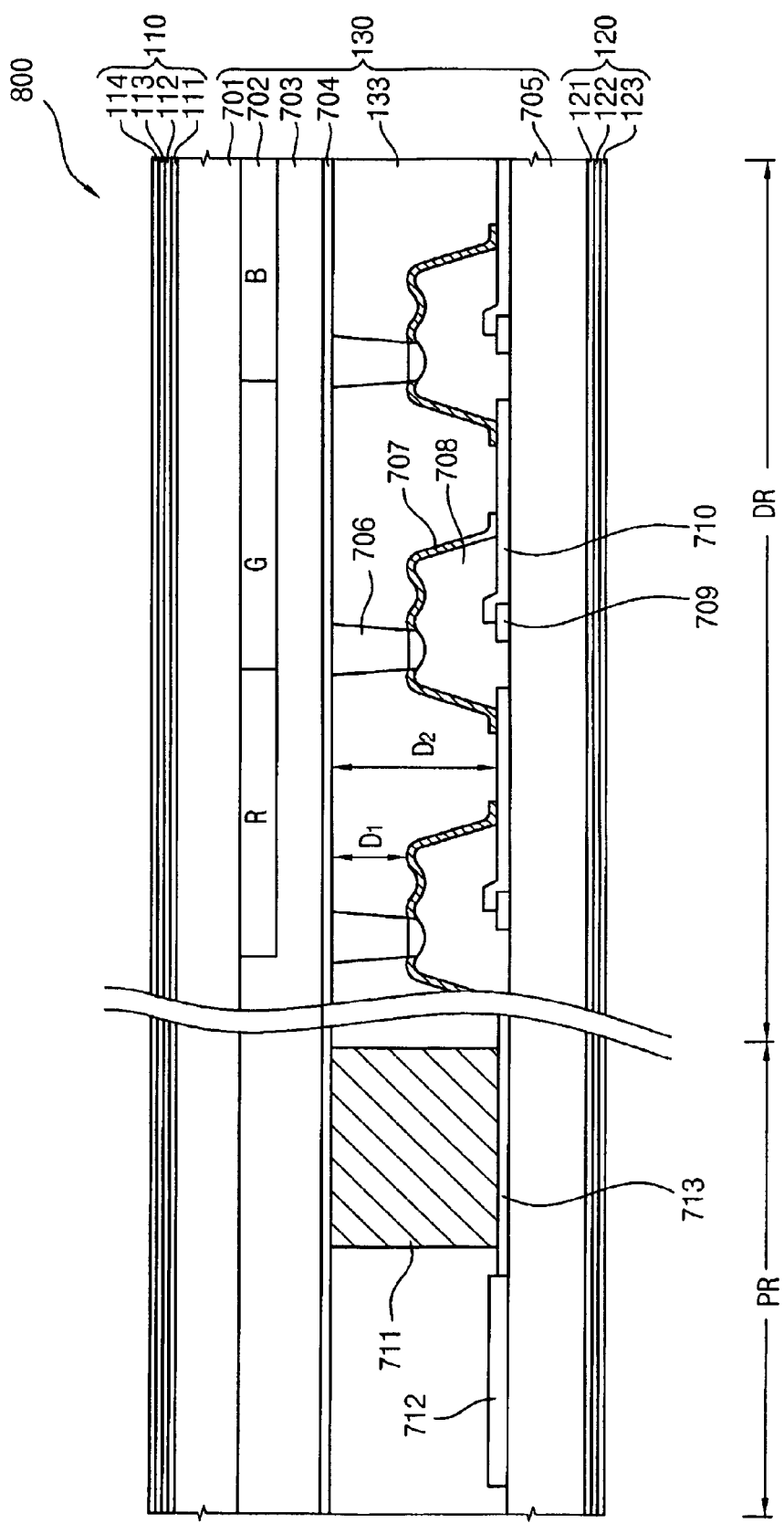
FIG. 10 is a cross-sectional view illustrating an exemplary embodiment of a display device having a polarizing film attached thereon according to the present invention.

FIG. 10 is a cross-sectional view illustrating a display device having an exemplary embodiment of a polarizing film attached thereon according to the present invention.

Referring to FIG. 10, an exemplary embodiment of a liquid crystal display (LCD) device 800, according to the present invention, includes an LCD panel 130, a backlight assembly (not shown) providing the LCD panel 130 with light, a first polarizing film 110 disposed on a first surface of the LCD panel 130, and a second polarizing film 120 disposed on an opposite second surface of the LCD panel 130.

The LCD panel 130 includes a color filter substrate, an array substrate and a liquid crystal layer 133 disposed between the color filter substrate and the array substrate.

The backlight assembly (not shown) is disposed under the LCD panel 130. The backlight assembly provides light to the LCD panel.

The backlight assembly includes a light guide plate, a lamp that provides the light guide plate with light, and optical sheets that enhance optical properties of light that exits from the light guide plate.

The color filter substrate includes a first transparent substrate 701, a color filter 702, a planarization layer 703 and a first transparent electrode 704.

The color filter 702 having a red color filter, a green color filter and a blue color filter is formed on the first transparent substrate 701.

The planarization layer 703 is formed on the color filter 702.

The first polarizing film 110 is attached on a surface of the color filter substrate by using an adhesive (not shown). The first polarizing film 110 includes a compensating layer 111, a first protecting layer 112, a first polarizing layer 113 and a second protecting layer 114. The compensating layer 111 is disposed on the LCD panel 130, and the first protecting layer 112 is disposed on the compensating layer 111. The first polarizing layer 113 is disposed on the first protecting layer 112, and the second protecting layer 114 is disposed on the first polarizing layer 113.

The compensating layer 111 includes discotic liquid crystal (102 in FIGS. 3 and 4) and compensates nematic liquid crystal (101 in FIG. 3) in the liquid crystal layer (133) of the LCD panel 130 to widen a viewing angle.

The first protecting layer 113 includes polyvinyl alcohol PVA. The PVA of the first polarizing layer 113 is stretched and dipped into an iodine (I) or dichromatic dye solution to arrange iodine molecules or dichromatic dye molecules along a stretching direction. The iodine molecules and the dichromatic dye molecules have a dichromatic character that absorb a first portion of light, which oscillates along the stretching direction, and transmit a second portion of light, which oscillates along a direction that is perpendicular to the stretching direction.

The first protecting layer 112 and the second protecting layer 114 include triacetyl cellulous (TAC). The first and second protecting layers 112 and 114 support and protect the first polarizing layer 113 disposed therebetween.

The array substrate includes a second transparent substrate 705, a thin film transistor (TFT) 709, a second transparent electrode 710, a gate driving circuit 712, a data driving circuit (not shown), a reflective electrode 707 and a connection wiring 713.

The array substrate includes a display region DR and a peripheral region PR. The TFT 709, the second transparent electrode 710 and the reflective electrode 707 are disposed in the display region DR. The gate driving circuit 712 and the data driving circuit (not shown) are disposed in the peripheral region PR.

The TFT 709 is disposed on the second transparent substrate 705. A plurality of TFTs 709 is arranged in a matrix shape on the second transparent substrate 705. The TFT 709 and the second transparent electrode 710 are electrically connected to each other.

An organic insulation layer 708 is formed on the second transparent substrate 705 to cover the TFT 709. The organic insulation layer 708 covers a portion of the second transparent electrode 710. The organic insulation layer 708 includes a plurality of openings exposing a portion of the second transparent electrode 710.

A plurality of embossing patterns is formed on the organic insulation layer 708. The reflective electrode 707 is formed on a side portion of the organic insulation layer 708 and an upper portion of the organic insulation layer 708. The reflective electrode 707 has a substantially uniform thickness, so that the embossing pattern of the organic insulation layer 708 is formed on a surface of the reflective electrode 707.

The embossing pattern enhances reflectivity. The reflective electrode 707 includes a metal having high reflectivity such as aluminum (Al), silver (Ag), chromium (Cr), for example, but is not limited thereto. Even when the backlight assembly (not shown) does not provide the LCD panel 130 with light, the LCD panel 130 displays an image by using an ambient light.

The connection wiring 713 is formed in the peripheral region PR of the array substrate. The gate driving circuit 712 in the peripheral region PR is electrically connected to the gate electrode of the TFT 709 through the connection wiring 713.

The TFT 709 includes a gate electrode, a drain electrode and a source electrode. The gate electrode is electrically connected to the connection wiring 713. The drain electrode is electrically connected to the second transparent electrode 710. The source electrode is electrically connected to a data driving circuit (not shown).

The second polarizing film 120 is attached to a lower face of the array substrate. The second polarizing film 120 includes a third protection layer 121, a second polarizing layer 122 and a fourth protection layer 123. The third protection layer 112 is disposed under the array substrate. The second polarizing layer 122 is disposed under the third protecting layer 121. The fourth protecting layer 123 is disposed under the second polarizing layer 122.

The second polarizing layer 122 includes polyvinyl alcohol PVA. The PVA of the second polarizing layer 122 is stretched and dipped into an iodine (I) or dichromatic dye solution to arrange iodine molecules or dichromatic dye molecules along a stretching direction. The iodine molecules and the dichromatic dye molecules have a dichromatic character that absorb a first portion of light, which oscillates along the stretching direction, and transmit a second portion of light, which oscillates along a direction that is perpendicular to the stretching direction. The second polarizing film 120 has a polarizing axis that is substantially perpendicular to a polarizing axis of the first polarizing film 110. Alternatively, the second polarizing film 120 has a polarizing axis that is substantially parallel with a polarizing axis of the first polarizing film 110.

The third protecting layer 121 and the fourth protecting layer 123 include triacetyl cellulous (TAC). The third and fourth protecting layers 121 and 123 support and protect the second polarizing layer 122 disposed therebetween.

A conventional protecting layer has a retardation value Rth of about 45 nm to about 55 nm along a thickness-wise direction. However, the third protecting layer 121, according to the present invention, has a retardation value Rth of about 110 nm to about 200 nm along a thickness-wise direction. When the third protecting layer 121 has a retardation value Rth of about 110 nm to about 200 nm, the color shift problem, which is one of the biggest problems of a conventional LCD device having only one compensating layer attached to one surface of the display panel, is avoided.

The color filter substrate and the array substrate are combined with a combining member 711, such as a sealant. The combing member 711 is disposed in the peripheral region PR of the color filter substrate and the array substrate.

Spacers 706 are formed on the first transparent electrode 704. The spacers 706 between the first transparent electrode 704 and the color filter substrate 132 define a space for the liquid crystal layer 133 between the color filter substrate and the array substrate.

The liquid crystal layer 133 is disposed between the color filter substrate and the array substrate. The liquid crystal layer 133 includes nematic liquid crystal molecules 101 as in FIG. 3A.

When electric fields are generated between the first and second transparent electrodes 704 and 710, or between the first transparent electrode 704 and the reflective electrode 707, an arrangement of nematic liquid crystal molecules 101 is changed to adjust optical transmittance.

A reference voltage is applied to the first transparent electrode 704. When the gate driving circuit 712 applies a gate signal to the TFTs 709, the TFTs 709 are turned on, so that the data driving circuit (not shown) applies a data signal to the second transparent electrode 710 and the reflective electrode 707 through the TFTs 709. Therefore, the arrangement of the nematic liquid crystal molecules 101 is changed.

Light generated by the backlight assembly (not shown) is, for example, linearly polarized by the second polarizing film 120 disposed under the array substrate, and optical transmittance is changed when the light passes through the liquid crystal layer 133. When the light passes through the color filter 702, only a portion of light with a specific color may pass through the color filter 702. Then, the portion of light with a specific color passes through the first polarizing film 110 to display an image. A phase of light that passes through the nematic liquid crystal molecules 101 of the liquid crystal layer 133 is compensated by the discotic liquid crystal molecules 102, as in FIG. 3B, of the compensating layer 111 to widen a viewing angle. Additionally, the third protecting layer 121 reduces the color shift problem.

The LCD device 800 in FIG. 8 employs, for example, the second polarizing layer 120 of FIG. 1. Alternatively, the LCD device 800 in FIG. 8 may employ the second polarizing layer 210 of FIG. 2.

The LCD device 800 in FIG. 8 corresponds to a transflective type LCD device. However, a transmissive type or a reflective type LCD device may employ the polarizing film having a TAC layer of which thickness of the TAC layer is adjusted in order to solve the color shift problem.

According to the present invention, a cost of manufacturing a display device is reduced because an expensive compensating film may be attached to only one surface of the LCD panel.

Furthermore, the color shift problem, which occurs when the compensating film is attached to only one surface of the LCD panel, is solved to enhance a display quality.

Having described the exemplary embodiments of the present invention and its advantages, it is noted that various changes, substitutions and alterations can be made herein without departing from the spirit and scope of the present invention as defined by the appended claims.

What is claimed is:

1. A polarizing film comprising:
   a first protecting layer;
   a polarizing layer formed on the first protecting layer; and
   a second protecting layer formed on the polarizing layer, the second protecting layer having a retardation value Rth of about 110 nm to about 200 nm along a direction corresponding to a thickness of the second protecting layer (thickness-wise direction), wherein the retardation value Rth along a thickness-wise direction is expressed by the following equation:

$Rth=d(n_x-n_z)$, wherein 'd' represents the thickness of the second protecting layer, $n_x$ represents a refractive index along an x-direction, and $n_z$ represents a refractive index along a z-direction.

2. The polarizing film of claim 1, wherein the polarizing layer comprises polyvinyl alcohol (PVA).

3. The polarizing film of claim 1, wherein the first and second protecting layers comprise triacetyl cellulose (TAC).

4. A polarizing film comprising:
   a first protecting layer;
   a polarizing layer formed on the first protecting layer;
   a second protecting layer formed on the polarizing layer, the second protecting layer having a first retardation value of about 45 nm to about 55 nm along a direction corresponding to a thickness of the second protecting layer (a thickness-wise direction); and
   a third protecting layer formed on the second protecting layer, the third protecting layer having a second retardation value Rth of about 45 nm to about 80 nm along the thickness-wise direction, wherein the retardation value Rth along the thickness-wise direction is expressed by the following equation:

$Rth=d(n_x-n_z)$, wherein 'd' represents a thickness of the second or third protecting layer, $n_x$ represents a refractive index along an x-direction, and $n_z$ represents a refractive index along a z-direction.

5. The polarizing film of claim 4, wherein the polarizing layer comprises polyvinyl alcohol (PVA).

6. The polarizing film of claim 5, wherein the first, second and third protecting layers comprise triacetyl cellulose (TAC).

7. A display device comprising:
   a liquid crystal display panel having a display substrate, an opposite substrate facing the display substrate, and a liquid crystal layer disposed between the display substrate and the opposite substrate;
   a first polarizing film having a compensating layer disposed on the opposite substrate, a first protecting layer disposed on the compensating layer, a first polarizing layer disposed on the first protecting layer, and a second protecting layer disposed on the first polarizing layer; and
   a second polarizing film having a third protecting layer disposed under the display substrate, a second polarizing layer disposed under the third protecting layer, and a fourth protecting layer disposed under the second polarizing layer, the third protecting layer of the second polarizing film satisfying the following equation, $Rth=6T+b$, wherein Rth represents a retardation value of the third protecting layer of the second polarizing film along a thickness-wise direction of the third protecting layer in a nanometer scale, 'T' represent a thickness of the liquid crystal layer of the liquid crystal display panel, the 'b' is in a range of about 100 to about 114.

8. The display device of claim 7, wherein the first and second polarizing layer comprises polyvinyl alcohol (PVA), and the first, second, third and fourth protecting layers comprise triacetyl cellulose (TAC).

9. A display device comprising:
   a liquid crystal display panel having a display substrate, an opposite substrate facing the display substrate, and a liquid crystal layer disposed between the display substrate and the opposite substrate;

a first polarizing film having a compensating layer disposed on the opposite substrate, a first protecting layer disposed on the compensating layer, a first polarizing layer disposed on the first protecting layer, and a second protecting layer disposed on the first polarizing layer; and a second polarizing film having a third protecting layer disposed under the display substrate, a fourth protecting layer disposed under the third protecting layer, a second polarizing layer disposed under the fourth protecting layer of which retardation value along a thickness-wise direction is in a range of about 45 nm to about 55 nm, and a fifth protecting layer disposed under the second polarizing layer, the third protecting layer of the second polarizing film satisfying the following equation, $$Rth=6T+b,$$

wherein Rth represents a retardation value of the third protecting layer of the second polarizing film along a thickness-wise direction of the third protecting layer in a nanometer scale, 'T' represent a thickness of the liquid crystal layer of the liquid crystal display panel, the 'b' is in a range of about 40 to about 53.

10. The display device of claim 7, wherein the first and second polarizing layer comprises polyvinyl alcohol (PVA), and the first, second, third, fourth and fifth protecting layers comprise triacetyl cellulose (TAC).

11. A display device comprising:

a liquid crystal display panel for displaying an image, the liquid crystal display panel having a first face and a second face;

a first polarizing film including a compensating layer formed on the first face of the liquid crystal display panel, a first protecting layer formed on the compensating layer to protect the compensating layer, a first polarizing layer formed on the first protecting layer, and a second protecting layer formed on the first polarizing layer; and a second polarizing film including a third protecting layer formed on the second face of the liquid crystal display panel, a second polarizing layer formed on the third protecting layer, and a fourth protecting layer formed on the second polarizing layer, wherein the third protecting layer has a retardation value Rth of one of about 45 nm to about 80 nm and about 110 nm to about 200 nm along a direction corresponding to a thickness of the third protecting layer (a thickness-wise direction).

12. The display device of claim 11, wherein the liquid crystal display panel comprises:

a color filter substrate;

an array substrate facing the color filter substrate; and a liquid crystal layer disposed between the color filter substrate and the color filter substrate.

13. The display device of claim 12, wherein the first polarizing film is disposed on the color filter substrate, and the second polarizing film is disposed under the array substrate.

14. The display device of claim 13, wherein the compensating layer comprises discotic liquid crystal, the first and second polarizing layer comprise polyvinyl alcohol (PVA), and the first, second, third and fourth protecting layers comprise triacetyl cellulose (TAC).

15. The display device of claim 14, wherein the third protecting layer has a retardation value Rth of about 110 nm to about 200 nm along a direction corresponding to a thickness of the third protecting layer (a thickness-wise direction), wherein the retardation value Rth along the thickness-wise direction is expressed by the following equation:

$$Rth=d(n_x-n_z),$$

wherein 'd' represents the thickness of the third protecting layer, $n_x$ represents a refractive index along an x-direction, and $n_z$ represents a refractive index along a z-direction.

16. The display device of claim 14, further comprising a fifth protecting layer disposed between the array substrate and the third protecting layer, wherein the third protecting layer has a retardation value of about 45 nm to about 55 nm along the thickness-wise direction, and the fifth protecting layer has a retardation value of about 45 nm to about 80 nm, wherein the retardation value Rth along the thickness-wise direction is expressed by the following equation:

$$Rth=d(n_x-n_z),$$

wherein 'd' represents a thickness of the third or fifth protecting layer, $n_x$ represents a refractive index along an x-direction, and $n_z$ represents a refractive index along a z-direction.

* * * * *